United States Patent
Shiao et al.

(10) Patent No.: US 6,922,227 B2
(45) Date of Patent: Jul. 26, 2005

(54) PLASTIC LIQUID CRYSTAL DISPLAY DEVICE AND METHOD FOR MANUFACTURING THE SAME

(75) Inventors: Po-Ling Shiao, Hsinchu (TW); Chi-Chang Liao, Tainan (TW); Chih-Ming Lai, Hsinchu (TW); Yih-Jun Wong, Tainan (TW); Hsien-Teng Chang, Changhua (TW); Wen-Bing Liu, Taipei (TW); Chien-Tsung Wu, Taichung (TW); Hsi-Hsin Shih, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 10/434,202

(22) Filed: May 9, 2003

(65) Prior Publication Data

US 2004/0046923 A1 Mar. 11, 2004

(30) Foreign Application Priority Data

Sep. 11, 2002 (TW) ........................................ 91120767 A

(51) Int. Cl.$^7$ ............................................ G02F 1/1333
(52) U.S. Cl. ....................................................... 349/158
(58) Field of Search ................................... 349/158, 113, 349/187

(56) References Cited

U.S. PATENT DOCUMENTS

| | | | | |
|---|---|---|---|---|
| 4,709,991 A | * | 12/1987 | Hoshikawa | 349/122 |
| 5,399,390 A | * | 3/1995 | Akins | 428/1.62 |
| 5,623,280 A | * | 4/1997 | Akins et al. | 345/104 |
| 6,061,112 A | * | 5/2000 | Ukita et al. | 349/113 |
| 6,639,645 B2 | * | 10/2003 | Sakuwa | 349/158 |
| 6,801,290 B2 | * | 10/2004 | Kim et al. | 349/156 |

* cited by examiner

Primary Examiner—Toan Ton
(74) Attorney, Agent, or Firm—Sughrue Mion, PLLC

(57) ABSTRACT

A plastic liquid crystal display device and a fabrication method thereof. A plastic substrate having a plurality of bumps on at least one surface thereof is integrally molded. A glass transition temperature ($T_g$) of the plastic substrate is greater than 150° C. A melt flow index (MFI) of the plastic substrate is greater than 2. A conformal reflective film on the plastic substrate with the bumps is formed. An insulating substrate opposite the plastic plate is provided. A transparent electrode is formed on an inner surface of the insulating substrate. A liquid crystal layer is inserted between the plastic substrate and the insulating substrate.

9 Claims, 4 Drawing Sheets

PLASTIC LIQUID CRYSTAL DISPLAY DEVICE AND METHOD FOR MANUFACTURING THE SAME

BACKGROUND OF THE INVENTION

1. Field of the Invention

The present invention relates to a plastic liquid crystal display device. More particularly, the invention relates to a plastic liquid crystal display having a reflector with bumps, and a fabrication method thereof.

2. Description of the Related Art

A reflective liquid crystal display does not require a backlight module as a light source, since it is so configured that an external incident light is reflected by a reflector plate provided inside the liquid crystal display, and the reflected light is utilized as a light source. This has been considered to be an effective means of reducing consumed electric power and providing thinner and brighter displays. Thus, reflective liquid crystal displays are widely used for portable devices.

Conventionally, in order to enhance reflectivity, a reflector with bumps is utilized in the reflective liquid crystal display. For example, in U.S. Pat. No. 5,204,765, Mitsui et al discloses a reflector with a number of convex portions (or bumps). The reflector with bumps can effectively control the reflective properties of the reflector to provide a bright screen image.

FIGS. 1A~1C are schematic illustrations of the different steps on the manufacture of a conventional reflector. In FIG. 1A, an insulation layer 120, such as a photosensitive resist layer, is formed on a glass substrate 110 by coating. In FIG. 1B, using photolithography, the insulation layer 120 is partially etched to provide the surface of the insulation layer 120 with a plurality of bumps 130. In FIG. 1C, a reflective film 140 is conformally formed on the insulation layer 120 having bumps 130 by deposition, and the conventional reflector is thus obtained. However, the manufacture of the conventional reflector is always undergoing coating, photolithography, and etching, thereby complicating fabrication and increasing manufacturing costs.

In U.S. Pat. No. 4,456,336, Chung et al discloses a glass substrate with micro-lenticular surface fabricated by a peening action, and a reflective film formed on the glass substrate to obtain a reflector. However, the profile of the micro-lenticular surface fabricated by peening is difficult to control, thereby affecting the reflective properties of the reflector.

In addition, the conventional reflector includes a glass substrate, thereby hindering brightening of the display.

SUMMARY OF THE INVENTION

The object of the present invention is to provide a method for manufacturing a plastic liquid crystal display device.

Another object of the present invention is to provide a plastic liquid crystal display having a reflector with bumps.

In order to achieve these objects, a method for manufacturing a plastic liquid crystal display device is provided. Also, the structure of the reflective liquid crystal display device is provided. A plastic substrate having a plurality of bumps on at least one surface thereof is integrally molded. A glass transition temperature ($T_g$) of the plastic substrate is greater than 150° C. A melt flow index (MFI) of the plastic substrate is greater than 2. A conformal reflective film on the plastic substrate with the bumps is formed. An insulating substrate opposite the plastic plate is provided. A transparent electrode is formed on an inner surface of the insulating substrate. A liquid crystal layer is inserted between the plastic substrate and the insulating substrate. In addition, the material of the plastic substrate can be PC (polycarbonate), PEN (polyethylenenaphthalate), PSF (polysulfone), PES (polyethersulfone), PAR (polyarylate), COP (cyclo olefin polymer), COC (cyclo olefin copolymer), PNB (polynorbornene), PI (polyimide), PEI (polyetherimide), PPS (polyphenylenesulfide), PEEK (polyetheretherketone) or epoxy.

The present invention improves on the prior art in that the plastic substrate with bumps is integrally molded and a reflective film is conformally formed on the plastic substrate with bumps. Moreover, the $T_g$ of the plastic substrate is greater than 150° C. and the MFI of the plastic substrate is greater than 2. Thus, the invention can simplify the conventional manufacturing process, thereby increasing throughput and ameliorating the disadvantages of the prior art.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The present invention provides a method of forming a reflector suitable for fabricating plastic liquid crystal display (LCD) products, such as reflective plastic LCD and transflective plastic LCD. Hereinafter, as a demonstrative example, the method of forming a reflector is applied to the formation of a reflective plastic LCD.

FIGS. 2A~2D are sectional views according to an embodiment of the present invention, which represent the different steps of the method for the manufacture of a reflector.

Figure 1A:
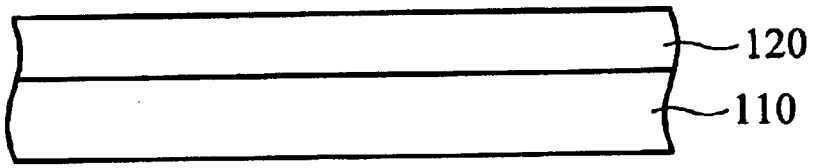
FIGS. 1A~1C are schematic illustrations of the different steps for the manufacture of the conventional reflector.
Figure 1B:
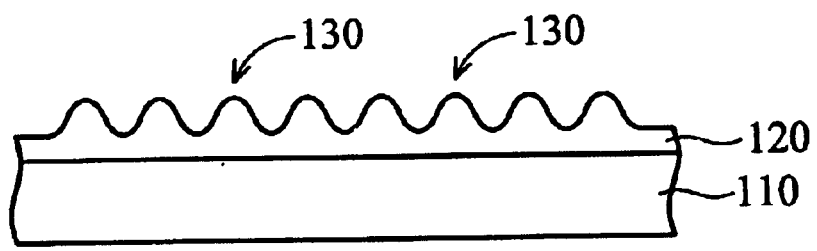
Figure 1C:
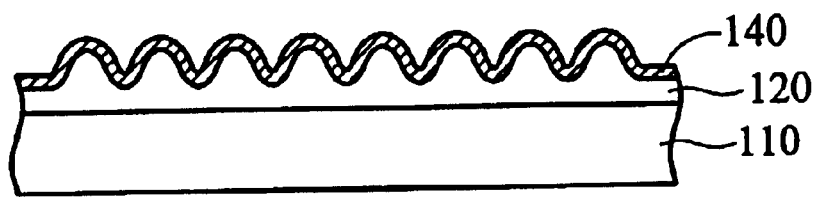
Figure 2A:
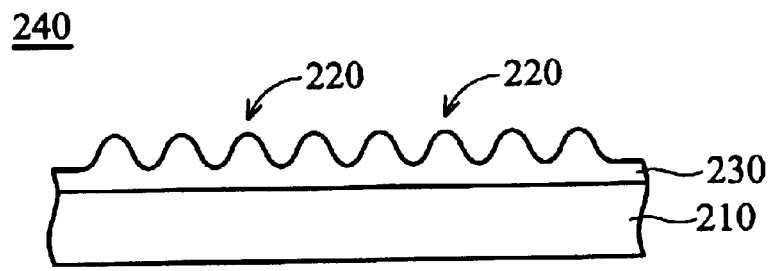
FIGS. 2A~2D are sectional views according to an embodiment of the present invention.

In FIG. 2A, an insulating layer (not shown) such as a photoresist layer (or photosensitive resin layer) is coated on a glass plate 210. Then, using photolithography, the insulating layer is partially etched back to form an insulating layer 230 having a plurality of bumps 220 on the glass plate 210. Thus, a mother die 240, including the glass plate 210 and the insulating layer 230, is obtained. The bumps 220 can be any desired shape, such as cylindrical, slanted, or others. It should be noted that the bumps 220 can be continuous or discontinuous. In order to simplify the illustration, the pattern of continuous bumps 220 is shown in FIGS. 2A~2D and FIG. 3, but does not limit the present invention.

Figure 2B:
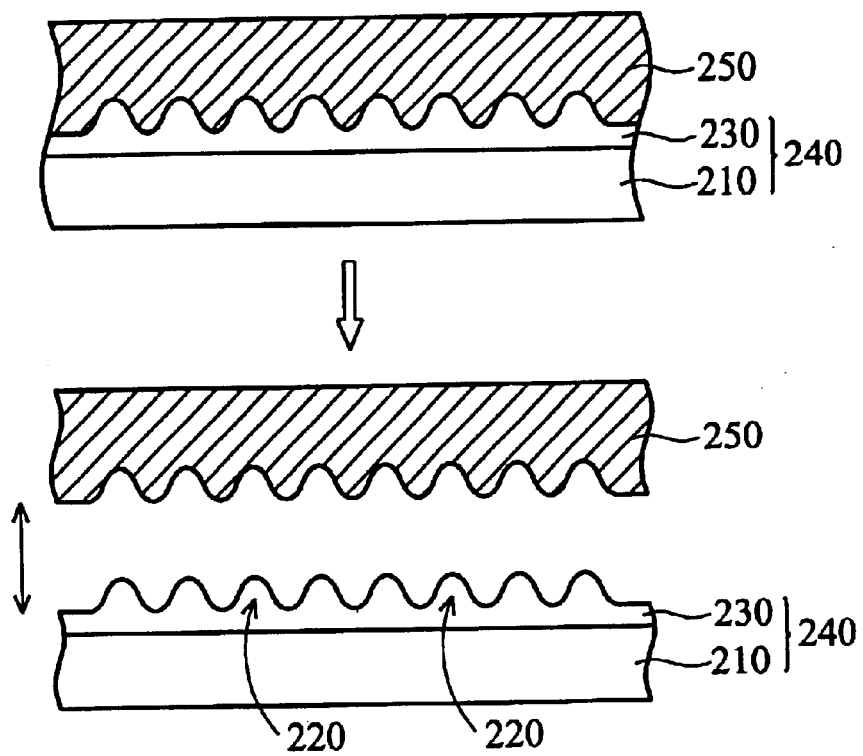

In FIG. 2B, a metal mold 250 (also referred as to a master matrix) is formed on the mother die 240 by, for example, electroplating or electroforming/electrotyping, and then the metal mold 250 and the mother die 240 are separated. Thus, a metal mold 250 having an opposite (negative) profile of the bumps 220 is obtained.

Figure 2C:
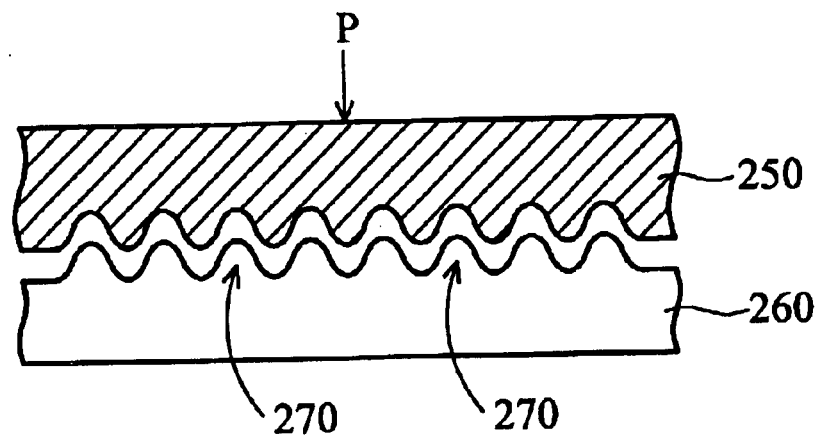

In FIG. 2C, using hot pressing, the metal mold 250 is impressed into a plastic substrate 260 under optimal pressure Panda raised temperature. Thus, a plastic substrate 260 having bumps 270 on at least one surface thereof is obtained. That is, the plastic substrate 260 having bumps 270 is integrally molded and can be mass produced.

It should be noted that the plastic substrate 260 of the present invention has heat-resistant, chemical-resistant, and non-deforming reproducible properties. That is, the glass transition temperature ($T_g$) of the plastic substrate 260 is preferably greater than 150° C. Moreover, depending on the requirements of different type display fabrication, the plastic substrate 260's glass transition temperature can be greater than 170° C., 180° C., 220° C. or 250° C. Also, the melt flow index (MFI) of the plastic substrate is preferably greater than 2. Also, depending on the requirements of different type display fabrication, the plastic substrate 260's melt flow index can be greater than 4, 6, 10 or 25. The plastic substrate 260 is transparent or opaque. The material of the plastic substrate 260 can be PC (polycarbonate), PEN (polyethylenenaphthalate), PSF (polysulfone), PES (polyethersulfone), PAR (polyarylate), COP (cyclo olefin polymer), COC (cyclo olefin copolymer), PNB (polynorbornene), PI (polyimide), PEI (polyetherimide), PPS (polyphenylenesulfide), PEEK (polyetheretherketone) or epoxy. Preferably, the material of the plastic substrate 260 is PC, PEN, PSF, PES, PAR, COP, COC, PNB, or PEI. More preferred materials are COC, COP and PNB. Here, the glass transition temperature ($T_g$) of part of the above plastic materials is shown as Table 1.

TABLE 1

| Material | PC | PAR | PES | COP | COC |
|---|---|---|---|---|---|
| $T_g$ (° C.) | 145–195 | 215 | 225 | 100–170 | 80–330 |

Generally, the higher the glass transition temperature ($T_g$) of the plastic material, the better the heat resistance. In this embodiment, concerning heatproof requirements, the plastic materials whose glass transition temperature ($T_g$) is greater than 150° C., 170° C., 180° C., 220° C. or 250° C. are employed.

Generally, the higher the melt flow index (MFI) of the plastic material, the better the flow properties during melting, thereby enabling the plastic substrate with microbumps to be precisely molded. The measure of the melt flow index (MFI) is according to, for example, ASTM 1238 standard, ISO 1133 standard, or performance under thermal deformation temperature plus 115° C. for heating temperature and 2.16 kg for loading, and then measuring the weight of the plastic material squeezed out from a tester for 10 minutes. In this embodiment, concerning the precise reproduction of molding, plastic materials whose melt flow index (MFI) is greater than 2, 4, 6, 10 or 25 are employed.

Figure 2D:
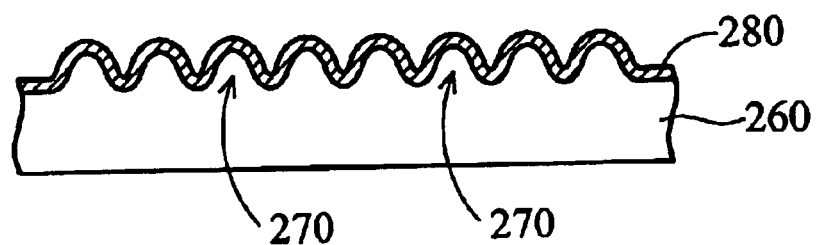

In FIG. 2D, a conformal reflective film 280 is formed on the plastic substrate 260 with the bumps 270, and thus a reflector including the plastic substrate 260 and the reflective film 280 is obtained. The reflective film 280 can be a metal film, such as an aluminum (Al) film or a silver (Ag) film, formed by deposition or sputtering. It should be noted that the reflective film 280 can include a transflective function, such as a transflective or semitransparent film. That is, the present invention is also suitable for the transflective LCD process.

As a demonstrative experiment, the reflective film 280 is respectively formed on the mother die 240 with the bumps 220 and the plastic substrate 260 with the bumps 270 (made of COC whose $T_g$ is 180° C. and MFI is 6). Then, the scatter distribution of the reflective light according to the above is detected, and the scatter distribution of both is almost the same is founded. Thus, it is identified that the profile (or pattern) of the bumps 270 of the plastic substrate 260 manufactured by the present method is almost the same as the bumps 220 of the mother die 240.

Although the hot pressing procedure is used in this example to form an integrally molded plastic substrate 260, other molding methods can be used, such as injection molding, extrusion embossing, monomer polymerization, solution forming and teeming. Nevertheless, a heating molding method, such as hot pressing, injection molding, or extrusion embossing, is preferred. It should be noted that because the plastic substrate 260 has a heat-resistant, chemical-resistant, and non-deforming reproducible properties, the profile (or pattern) of the bumps 270 of the plastic substrate 260 is almost the same as the bumps 220 of the mother die 240 after molding. Thus, the inventive method is well suited for fabricating plastic reflective display products.

Figure 3:
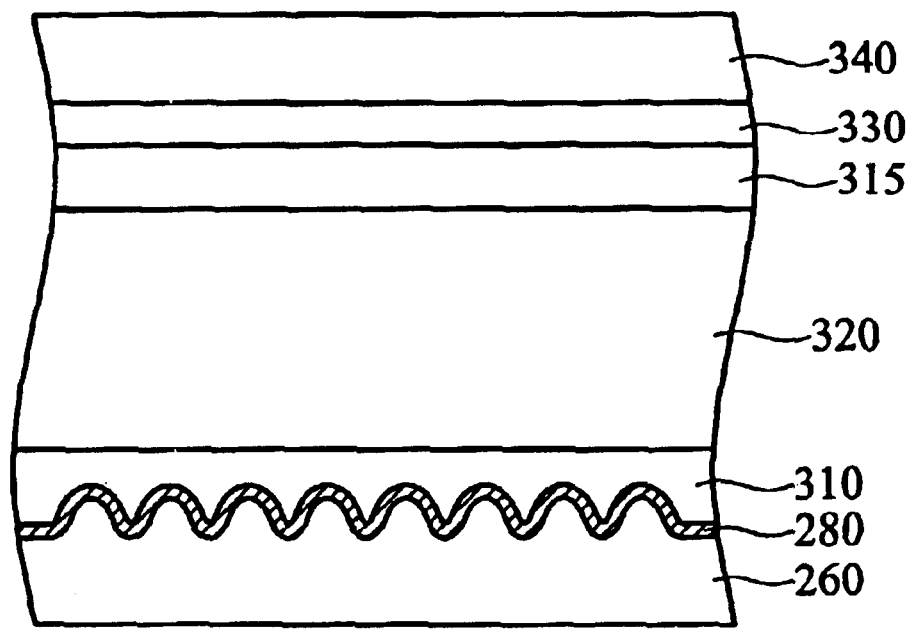
FIG. 3 is a sectional view showing the application of the present invention to a reflective plastic liquid crystal display device.

Next, referring to FIG. 3, the application of the present invention to a reflective liquid crystal display device is provided.

In FIG. 3, an alignment film 310 is formed on the reflective film 280. An insulating substrate 340 opposite the plastic substrate 260 is provided, wherein the insulating substrate 340 can be a glass plate or a plastic plate. A transparent electrode 330, such as an ITO (indium tin oxide) film or an IZO (indium zinc oxide) film, is formed on the inner side of the insulating substrate 340. Moreover, another alignment film 315 is formed on the inner side of the transparent electrode 330.

In FIG. 3, a liquid crystal layer 320 is inserted between the plastic substrate 260 and the insulating substrate 340. Thus, a reflective plastic liquid crystal display device having the integrally molded plastic substrate 260 is obtained. In order to avoid obscuring aspects of the present invention, the details of the RLCD process are not further described.

The present invention provides a method of forming a reflective plastic liquid crystal display device having an integrally molded plastic substrate with bumps, and the structure thereof. Moreover, since the $T_g$ of the plastic substrate is greater than 150° C. and the MFI of the plastic substrate is greater than 2, the plastic substrate has at least heat-resistant and non-deforming reproducible properties. Thus, the invention can simplify the conventional manufacturing process, thereby increasing throughput, decreasing the production cost and ameliorating the disadvantages of the prior art.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for manufacturing a plastic liquid crystal display device, comprising the steps of:

integrally molding a plastic substrate having a plurality of bumps on at least one surface thereof, wherein the plastic substrate has heat-resistant and non-deforming reproducible properties; and forming a conformal reflective film on the plastic substrate with the bumps;

wherein the glass transition temperature ($T_g$) of the plastic substrate is greater than 150° C. and the melt flow index (MFI) of the plastic substrate is greater than 2.

2. The method according to claim 1, wherein the plastic substrate is a PSF (polysulfone), PES (polyethersulfone), PAR (polyarylate), COP (cyclo olefin polymer), COC (cyclo olefin copolymer), PNB (polynorbornene), PEI (polyetherimide), PPS (polyphenylenesulfide), PEEK (polyetheretherketone) or epoxy substrate.

3. The method according to claim 1, wherein the plastic substrate with the bumps is integrally molded by hot pressing, injection molding or extrusion embossing.

4. The method according to claim 1, wherein the reflective film is an aluminum (Al) or silver (Ag) film.

5. The method according to claim 1, further comprising the steps of:

providing an insulating substrate opposite the plastic substrate;

forming a transparent electrode on an inner surface of the insulating substrate; and forming a liquid crystal layer inserted between the plastic substrate and the insulating substrate.

6. A method for manufacturing a plastic liquid crystal display device, comprising the steps of:

integrally molding a plastic substrate having a plurality of bumps on at least one surface thereof, wherein the glass transition temperature ($T_g$) of the plastic substrate is greater than 150° C. and the melt flow index (MFI) of the plastic substrate is greater than 2;

and forming a conformal reflective film on the plastic substrate with the bumps;

wherein the plastic substrate comprises COP (cyclo olefin polymer), COC (cyclo olefin copolymer) or PNB (polynorbornene).

7. The method according to claim 6, wherein the plastic substrate with the bumps is integrally molded by hot pressing, injection molding or extrusion embossing.

8. The method according to claim 6, wherein the reflective film is an aluminum (Al) or silver (Ag) film.

9. The method according to claim 6, further comprising the steps of:

providing an insulating substrate opposite the plastic plate;

forming a transparent electrode on an inner surface of the insulating substrate; and forming a liquid crystal layer inserted between the plastic substrate and the insulating substrate.

* * * * *